May 25, 1937.  E. W. GARD  2,081,296
METHOD AND APPARATUS FOR CONTINUOUS FILTRATION
Filed Aug. 27, 1934
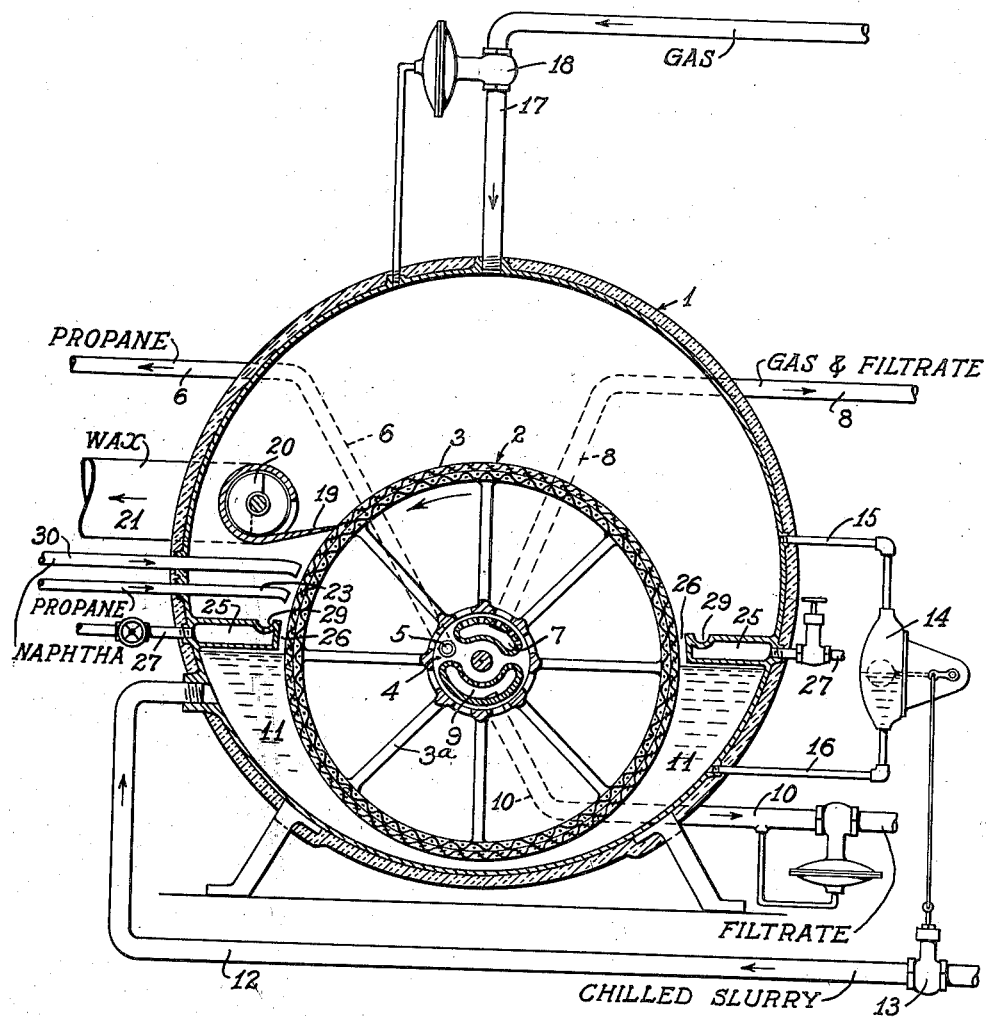
INVENTOR.
Earle W. Gard
BY Philip Subkow
ATTORNEY.

Patented May 25, 1937

2,081,296

UNITED STATES PATENT OFFICE 2,081,296

METHOD AND APPARATUS FOR CONTINUOUS FILTRATION

Earle W. Gard, Palos Verdes Estates, Calif., assignor to Union Oil Company of California, Los Angeles, Calif., a corporation of California Application August 27, 1934, Serial No. 741,540

12 Claims. (Cl. 210—201)

The present invention relates to continuous filtration, and more particularly covers a method and apparatus which may be used in a continuous manner for the filtration of wax-bearing oils diluted with volatile solvents.

The usual continuous filters employed for the purpose of the filtration of chilled mixtures of diluent, such as liquid propane, and a wax-bearing oil contain a filtering drum slowly rotating within the shell, the lower portion of which is filled with the diluted waxy oil to be treated. One of the reasons for diluting the wax-bearing oil is to aid the precipitation of the wax from solution. This precipitation of the wax is brought about by lowering the temperature of the mixture to a temperature of below 0° F. and ranging to —40° F. and even lower depending on the character of the oil being treated, the wax content thereof, type of diluent employed, etc. The filter drum rotating in said oil containing shell is usually only partly submerged in the liquid mixture, the upper part of the filter shell being filled with vapors, such as propane gas. To cause a filtration through the filter element covering the filter drum there must obviously be a differential between the pressures within and without said filter drum. This filtration causes the filtrate to pass into the interior of the filter drum from which it is withdrawn by any well known means, the wax precipitating on the filtering element and being removed from the system by scraping the wax off the filter element. If the pressure is not sufficiently high this wax cake will not be dry, but will contain a considerable quantity of oil and diluent. To eliminate this waste of oil and diluent, it has been previously proposed to blow the filter cake by maintaining a gas pressure slightly above atmospheric in the upper part of the filter shell above the oil-wax-diluent mixture. However, until the present time such blowing could not be carried out efficiently because of the fact that it was impossible to use sufficiently high blowing pressures. The reason for this resided in the fact that such high pressures necessitated higher temperatures to prevent the liquefaction of the gas, such as propane gas, used for the blowing of the wax cake. However, the high temperatures thus generated prevented the proper precipitation of the wax from the oil-wax-diluent solution, since it is obvious that the percentage of wax precipitated and held in suspension in an oil-diluent mixture is a function of the temperature of such mixture. Therefore other conditions being the same, the higher the temperature of such mixture, the greater is the percentage of wax remaining in solution therein.

It is therefore the main object of the present invention to provide a method and structure which will obviate the above defects. Another object of the invention is to provide continuous filtration which will produce a dry wax cake. A still further object of the invention is to provide a continuous filter which may be operable at high blowing pressures without necessitating the raising of the temperature of the oil-diluent mixture being filtered.

The above and other objects may be realized and obtained by providing the usual type of a continuous filter with means for separating the upper gas-containing portion of the filter shell from the lower portion thereof containing the diluted slurry or mixture to be filtered. Preferably, these separating means must consist of hollow dams through which a chilling fluid may be passed for the purpose of preventing the heating of the chilled slurry by the warmer gases under pressure contained in the upper part of the shell. Such chilling of the interior of these dams will naturally cause a partial condensation of the gases, such as propane gas, used for the blowing purposes, thus necessitating the provision of means for the collection and withdrawal of such condensate.

Therefore, broadly stated, the invention resides in minimizing the surface of contact between the slurry to be chilled and the gaseous substance located above said slurry. The invention further resides in chilling the surface of the slurry. The invention still further resides in the provision of dams within the filter shell, said dams being adapted to separate the liquid-containing portion of the shell from the gas-containing portion thereof, thus permitting the use of higher pressures within said gas-containing portion of the shell without the necessity of imparting such higher pressures to the wax-oil-diluent mixture. The present invention also resides in the use of hollow dams substantially at the surface of contact between the liquid slurry being filtered and the gaseous mixture used for the blowing of the filter cake, said hollow dams being adapted to be internally chilled thereby preventing the heating of the slurry and thus avoiding the re-dissolving of the wax held in suspension in said slurry. In the alternative, these dams may be constructed of a material having a low heat conductivity so that the chilled slurry would not be heated by the warmer gases in the upper portion of the filter shell.

More particularly stated, the invention resides in a continuous filter for the filtration of a chilled wax-bearing oil diluted by a diluent such as liquid propane, said filter comprising an outer shell adapted to be partly filled with the above mentioned chilled oil-wax-diluent slurry, the remaining portion of the shell being filled with a gas under pressure, a segmental rotating filtering drum within said filter shell, a filter element surrounding said filter drum, means within the filter drum adapted to withdraw the dewaxed filtrate from the system, scraping means in contact with the filtering element for the removal of the wax cake from said filtering element, and hollow dams disposed substantially at the surface of the slurry being dewaxed, and adapted to maintain a differential of pressure in the upper and lower portions of the filter shell, as well as different temperatures in the gas and liquid containing portions of said shell. The invention still further resides in the use of a chilling fluid which may be sprayed into or evaporated in the above mentioned hollow dams to maintain a low temperature therein thus chilling the surface of the slurry being dewaxed and preventing the redissolving of the wax held in suspension therein. The invention still further resides in the provision of means on said dams for the collection and withdrawal from the system of any condensate produced on the surface of said dams by the contact of the warmer gaseous medium under pressure with the chilled surfaces of said dams. These dams will also act as a barrier to any heat transfer from the warmer portion of the filter shell to the colder sections thereof.

The invention will be more clearly understood by reference to the accompanying drawing which forms a part of the present specification, and the sole figure of which shows a diagrammatic cross-sectional view of a preferred form of a continuous filter provided with the improvements constituting the subject matter of the present invention.

Referring more particularly to the drawing, the continuous filter preferably comprises an insulated gas-tight pressure casing or shell 1 enclosing a perforated drum 2 having a filter element 3 on its periphery. The filtering drum 2 is divided into segments by means of imperforate plates 3a, these segments opening into a valve assembly 4 located along the axis of the filter drum 2. The valve assembly 4 consists of a valve 5 connected to line 6, valve 7 connected to line 8, and valve 9 connected to line 10, the purposes of these valves and lines being described more fully hereinbelow in connection with the description of the operations of the filter. The chilled wax-oil-diluent mixture or slurry is introduced into the lower portion 11 of shell 1 through a line 12, the rate of introduction of said slurry being controlled by a valve 13 on said line 12, this valve being actuated by a float control 14 connected by means of pipes 15 and 16 with the interior of shell 1. The interior of shell 1, above the wax slurry, is filled with a gaseous substance, such as gaseous propane under pressure, this gas being used for blowing purposes described hereinbelow and being introduced into said shell through line 17. The rate of introduction and the pressure of this gaseous medium in the shell are regulated by valve 18 on line 17. A wax removing scraper 19 abuts against the filter element 3, the scraped material being removed by means of a scroll conveyer 20 and conduit 21 to a wax pot not shown in the drawing. The structure is also provided with a spray line 23 through which propane or a similar substance is conveyed into the system and sprayed onto the periphery of the filter drum 2 to chill the filter drum and filter element before the latter dips into the slurry being filtered.

Substantially at the surface of the slurry being dewaxed, the filter shell 1 is provided with hollow dams 25 extending the length of the cylindrical shell 1 and reaching from the periphery of the shell substantially to, but not quite abutting against the filter element 3. The space 26 between the dams 25 and the filter element 3 is provided for the passage of the filter cake which accumulates on the surface of said filter elements 3 during the passage of the filtrate into the interior of the filter drum 2. The hollow interior of the dams 25 are connected with lines 27 through which a chilling material, such as propane, may be sprayed into said dams and evaporated therein thus lowering the temperature in these dams. Obviously, any other means may be employed for chilling these dams. However, it is to be remembered that the interior of the dams 25 must be approximately at the temperature of the chilled slurry being dewaxed, since otherwise the slurry will be heated, thus causing some of the wax to be re-dissolved in the oil-diluent mixture. In view of the fact that the gas in the upper portion of the shell 1 is maintained at a superatmospheric pressure, its temperature is naturally above that of the chilled slurry and of the dams 25 separating the two fluids. Obviously, when propane is used as the gaseous mixture, the low temperatures of the upper surface of the hollow dams 25 will cause a condensation of such propane. Therefore, these upper surfaces of the dams are provided with drains 29 for collecting such propane condensates and for the withdrawal thereof from the system.

In operation, the oil-wax-diluent mixture or slurry, chilled down to the temperature necessary for the precipitation of the wax, and for the suspension thereof in such mixture, is introduced into the space 11 through line 12, the rate of introduction and the level of the slurry in the shell 1 being regulated by means of valve 13, actuated by float control 14, depending on the rate of filtration. Obviously, such rate of filtration varies with the character of the oil being dewaxed, the amount of wax in said oil, type of diluent or anti-solvent used, as well as the ratio thereof. Also, the above factors will affect the temperature to which the mixture must be chilled to cause the precipitation of the wax. This temperature ranges as low as −40° F. and even lower.

The filter drum 2, together with the filter element 3 provided on the periphery of the drum, are slowly rotated within the shell 1. By maintaining a pressure differential between the space 11 and the control valve 9 and line 10 connected therewith, filtration will occur in the segments dipping into the slurry, the filtrate, consisting of dewaxed oil and diluent, passing through the filter element 3 and flowing into the control valve 9 and out through line 10 connected therewith, while the wax accumulates in the form of a cake on the surface of the filter element. The continuous rotation of the filter drum 2 then brings this wet filter cake into the space above the slurry 11. In this space the wax is dried by the blowing of a gas, such as propane gas, under pressure. The provision of the above described chilling dams 25 permits the maintenance of any desired pressure in the gaseous space in the shell 1, the pressure employed depending on various conditions such as the character of the wax to be blown, etc., and ranging as high as 100 pounds per square inch or even higher. This gas is introduced continuously through line 17 controlled by valve 18, the gas passing through the filter cake on the filter element 3 and removing from said filter cake any oil and diluent entrained therein. This mixture is forced into the interior of the filter drum 2 and is conveyed therefrom into valve 7 and out through line 8. The valve 7 may be arranged so as to provide any necessary, different and desired differentials at the beginning and at the end of this blowing operation. Similarly, valve 9 may also be constructed and adapted so as to create various differentials in the filtration cycle. Thus, this differential may be comparatively small at the beginning of this cycle, gradually increasing as the wax accumulates on the filter element 3.

The thus dried wax cake is then scraped off the filter element 3 by scraper 19 and removed from the system by means of conveyor 20 and conduit 21. In view of the fact that the temperature in the upper portion of shell 1 is higher than that in the space 11, the filter element 3 is naturally warmed up during its passage through the gaseous space. In view of the fact that such rise in temperature may cause some of the wax to be re-dissolved in the oil, it may be advisable to chill the drum 2 and the filter element 3 before they dip again into the slurry being filtered. For this purpose propane may be introduced through line 23 and sprayed onto the filter element 3 before the latter is dipped back into the slurry by rotation of the drum. Such sprayed propane, by its evaporation chills the space, the gaseous propane thus produced being withdrawn from the system through valve 5 and line 6.

The structure may also be provided with means for the washing of the filter element with naphtha or similar substance. Such washing should occur preferably after the scraping and removal of the wax but prior to the propane chilling of the filter element and drums. The naphtha thus introduced into the filter drum may be withdrawn therefrom either through a separate line (not shown) or through line 6 and/or 8 by proper valving thereof. Line 30 disposed above propane line 23 may be used for such naphtha washing.

It is thus clear that the improved continuous filter may be operated so as to produce a wax cake of any desired dryness without any substantial effect on the amount of wax precipitated and removed from the waxy oil. This is accomplished by regulating the temperature of the wax-oil-diluent slurry so as to obtain the necessary or desired precipitation of wax, and at the same time maintaining and operating the blowing phase of the operation at any desired pressure. As stated above, the provision of the hollow chilling dams substantially at the surface of contact between the slurry and the gas employed for this blowing operation permits such operation of the structure.

Although, liquid propane has been disclosed as the diluent for the waxy oil, it is obvious that any other diluent or anti-solvent known to the art may be substituted therefor. Also, any other chilling means may be sprayed through line 23 for the cooling of the filter element before it comes in contact with the slurry being filtered. Similarly, other mediums, such as liquid ethane, butane, iso-butane, or mixtures thereof, may be used for the chilling of the interiors of the dams 25. These or other substances may also be used in a gaseous form for the blowing of the wet wax cake.

This invention is not limited by any theory of its mechanism nor by any details which have been given merely for purposes of illustration, but is limited only in and by the following claims in which I wish to claim all novelty inherent in the invention.

I claim:

1. The method of separating wax from a slurry of oil containing suspended wax which comprises introducing a mixture of said slurry into a closed receptacle containing a filtering element, passing the oil through the filtering element by introducing a condensable gas under pressure into said receptacle, chilling said condensable gas in said receptacle by contact with a cold surface positioned at approximately the surface of said slurry in said receptacle so that solution of wax in the oil is substantially prevented.

2. The method of operating a pressure filter provided with an outer shell, a filter element and means for introducing a pressure gas, for introducing and withdrawing filter slurry and for withdrawing filtrate, which method comprises introducing a filter slurry, introducing a condensable gas to supply the pressure necessary for filtration, chilling the condensable gas substantially at the surface of contact with the filter slurry, and removing the condensed portion of said chilled condensable gas away from contact with said filter slurry.

3. In an apparatus for dewaxing wax bearing oils, a closed pressure filter, a rotatable filter element within said pressure filter, means for continuously introducing a wax containing slurry into the lower portion of said pressure filter, means for introducing a gaseous substance into the upper portion of said pressure filter, and means substantially at the surface of contact between the slurry and the gaseous substance between the periphery of the filter and the filter element, said means being chilled to prevent the gaseous substance from heating the slurry.

4. In an apparatus for dewaxing wax bearing oil, a closed pressure filter, a filter element within said pressure filter, means for introducing a slurry containing wax in suspension into the lower portion of said pressure filter, means for introducing a gaseous substance into the upper portion of said pressure filter and means substantially at the surface of contact between the slurry and the gaseous substance between said pressure filter and said filter element, and means to chill said last mentioned means to prevent the gaseous substance from heating the slurry.

5. In an apparatus for dewaxing a chilled slurry of a mixture of oil, wax and diluent, a closed pressure shell, means for continuously introducing the slurry into the lower portion of said shell, a filter element within said shell and adapted to rotate therein and to be partially immersed in the slurry, means for introducing and maintaining a gaseous substance in the upper portion of said shell at any desired superatmospheric pressure, and chilling means disposed substantially at the surface of contact between the slurry and the gaseous substance under pressure and adapted to minimize the surface of the slurry exposed to said gaseous substance and to prevent the heating of the former by said latter.

6. In a structure according to claim 5 wherein the last mentioned means comprise hollow dams extending the length of the shell and substantially closing the space substantially immediately above the surface of the slurry between the periphery of the shell and the filter element.

7. In a structure according to claim 5 wherein the last mentioned means comprise hollow dams, extending the length of the shell and substantially closing the space substantially immediately above the surface of the slurry between the periphery of the shell and the filter element, said dams being provided with means adapted to chill the interior thereof, thus preventing the warmer gaseous substance under pressure from heating the chilled slurry.

8. In an apparatus for continuous dewaxing of wax bearing oils, a closed pressure shell, means for continuously introducing a chilled slurry containing wax in suspension into the lower portion of said shell, means connected with said slurry-introducing means adapted to maintain a predetermined liquid level of said slurry in said shell, a rotatable filter element within said shell adapted to be partly submerged in said slurry, means within said filter element adapted to withdraw the filtrate passing through the filter element, means connected with the upper portion of the shell and adapted to supply gas under pressure to the space between the casing and the filter element above the liquid level of the slurry, and hollow dams disposed substantially at the surface of the slurry between the periphery of the shell and the filter element and adapted to prevent the warmer gas under pressure from heating the chilled slurry, said hollow dams being provided with means for chilling the interior thereof.

9. In a structure according to claim 8 wherein the last mentioned dams are provided with means on their upper surfaces for collecting any condensate caused by the condensing of the warmer gases.

10. In a structure according to claim 8 wherein the filter element is provided with means for causing the gas under pressure to flow through the upper surface of the filter element to remove therefrom any filtrate entrained thereon.

11. A structure according to claim 8 including scraping means in contact with the surface of the rotating filter element adapted to remove therefrom the wax accumulating thereon.

12. A structure according to claim 8 including means for chilling the surface of the filter element prior to its dipping into the chilled slurry being filtered.

EARLE W. GARD.